(12) United States Patent
Zhang et al.

(10) Patent No.: US 12,704,205 B2
(45) Date of Patent: Aug. 11, 2026

(54) REFRIGERATOR, METHOD FOR FITTING A REFRIGERATOR AND LINE BUSHING FOR INSERTION INTO A WALL OPENING IN A WALL OF A REFRIGERATOR

(71) Applicant: BSH Hausgeräte GmbH, Munich (DE)

(72) Inventors: Ming Zhang, Ulm (DE); Meik Malisi, Hüttlingen (DE); Andreas Vogl, Haunsheim (DE)

(73) Assignee: BSH Hausgerate GmbH, Munich (DE)

( * ) Notice: Subject to any disclaimer, the term of this patent is extended or adjusted under 35 U.S.C. 154(b) by 125 days.

(21) Appl. No.: 18/707,275

(22) PCT Filed: Sep. 21, 2022

(86) PCT No.: PCT/EP2022/076195

§ 371 (c)(1),
(2) Date: May 3, 2024

(87) PCT Pub. No.: WO2023/083517

PCT Pub. Date: May 19, 2023

(65) Prior Publication Data

US 2025/0027582 A1 Jan. 23, 2025

(30) Foreign Application Priority Data

Nov. 9, 2021 (DE) .................... 10 2021 212 560.3

(51) Int. Cl.

| | |
|---|---|
| ***F16L 5/10*** | (2006.01) |
| ***F25D 23/06*** | (2006.01) |
| ***H02G 3/22*** | (2006.01) |

(52) U.S. Cl.
CPC .............. *F16L 5/10* (2013.01); *F25D 23/065* (2013.01); *H02G 3/22* (2013.01)

(58) Field of Classification Search
CPC .... F25D 23/065; F25D 23/061; F25D 23/068; F16L 5/10; F16L 59/121; F16L 5/02;
(Continued)

(56) References Cited

U.S. PATENT DOCUMENTS 3,599,442 A * 8/1971 Hanson ................ F25D 17/065 62/285
4,186,945 A * 2/1980 Hahn ................... F25D 23/065 285/19

(Continued)

FOREIGN PATENT DOCUMENTS

| | | | |
|---|---|---|---|
| DE | 102014226679 | A1 | 6/2015 |
| DE | 102019216651 | A1 | 4/2021 |
| ES | 2590557 | A1 | 11/2016 |

OTHER PUBLICATIONS

DE102019216651 A1 translation (Year: 2021).*

*Primary Examiner* — Hiwot E Tefera
(74) *Attorney, Agent, or Firm* — Laurence A. Greenberg; Werner H. Stemer; Ralph E. Locher

(57) ABSTRACT

A line bushing for insertion into a wall opening in a wall of a refrigerator, in particular a domestic refrigerator. The bushing has an elastic body formed with a first cutout for the passage of a first line and at least one second cutout running next to the first cutout for the passage of a second line. The second cutout is in the form of a blind hole with a base. A local depression is formed in the base of the second cutout for plugging the second line through the base.

16 Claims, 4 Drawing Sheets

(58) Field of Classification Search
CPC ........ H02G 3/22; H02G 3/083; H02G 15/013; B60R 16/0222; F16J 15/00; F16J 15/021; F16J 15/024; F16J 15/025
USPC ........ 16/2.1; 174/650, 152 G, 152 R, 153 G, 174/135
See application file for complete search history.

(56) References Cited

U.S. PATENT DOCUMENTS

| | | | | |
|---|---|---|---|---|
| 4,675,937 | A * | 6/1987 | Mitomi | F16B 2/22 403/194 |
| 5,000,010 | A * | 3/1991 | Powell | F25D 23/065 62/277 |
| 5,238,299 | A * | 8/1993 | McKinney | F25D 23/065 312/406 |
| 6,119,305 | A * | 9/2000 | Loveall | H05K 9/0018 174/152 G |
| 6,240,597 | B1 * | 6/2001 | Mochizuki | H02G 15/013 174/152 G |
| 8,969,741 | B2 | 3/2015 | Aldrich et al. | |
| 2001/0044984 | A1 * | 11/2001 | Ono | B60R 16/0222 16/2.5 |
| 2002/0036098 | A1 * | 3/2002 | Okuhara | B60R 16/0222 174/152 G |
| 2003/0015338 | A1 * | 1/2003 | Sato | H02G 3/22 174/668 |
| 2003/0015339 | A1 * | 1/2003 | Sato | H02G 3/22 174/668 |
| 2003/0062694 | A1 * | 4/2003 | Uchida | B60R 16/0222 277/634 |
| 2005/0139381 | A1 * | 6/2005 | Sanroma | H02G 15/013 174/152 R |
| 2007/0137892 | A1 * | 6/2007 | Knagge | B60R 16/0222 174/658 |
| 2011/0067201 | A1 * | 3/2011 | Okuhara | B60R 16/0222 16/2.1 |
| 2011/0079417 | A1 * | 4/2011 | Okuhara | B60R 16/0222 174/152 G |
| 2011/0203833 | A1 * | 8/2011 | Miyakoshi | H02G 3/22 174/153 G |
| 2014/0102780 | A1 * | 4/2014 | Aldrich | H02G 3/083 174/653 |
| 2016/0039368 | A1 * | 2/2016 | Shitamichi | F16L 5/02 16/2.2 |
| 2018/0126929 | A1 * | 5/2018 | Miller | F16L 5/10 |
| 2020/0288903 | A1 * | 9/2020 | Liu | F16J 15/024 |
| 2024/0120134 | A1 * | 4/2024 | Kobayashi | B60R 16/0215 |

* cited by examiner

REFRIGERATOR, METHOD FOR FITTING A REFRIGERATOR AND LINE BUSHING FOR INSERTION INTO A WALL OPENING IN A WALL OF A REFRIGERATOR

TECHNICAL FIELD

The present invention relates to a refrigerator, in particular a household refrigerator such as an icebox, a chest freezer or an upright freezer or a fridge-freezer combination, a method for fitting a refrigerator and a line bushing for insertion into a wall opening in a wall of a refrigerator.

PRIOR ART

In household refrigerators a refrigeration compartment to accommodate refrigerated goods is normally defined by an interior compartment, which is surrounded on an exterior surface at least partially by an insulating foam material. In order to introduce lines into the interior compartment, e.g. refrigerant lines to supply an evaporator arranged in the interior compartment, a wall opening through which the lines are passed is normally designed in at least one wall of the interior compartment. In order to prevent insulating foam from penetrating into the interior space of the refrigeration compartment and moisture from penetrating into the insulating foam, a sealing line bushing can be provided.

For example, DE 10 2019 216 651 A1 describes a line bushing with an elastic body which has a first cutout extending along an axis to accommodate a first line and at least one second cutout which runs next to the first cutout and is designed as a blind hole. For the passage of a second line the latter is introduced into the blind hole and is plugged through the body. The advantage of this is that after plugging through there is a close contact between body and second line. To facilitate the plugging through, the base must have a small wall thickness. This may result in the opening created during plugging through expanding unintentionally.

SUMMARY OF THE INVENTION

It is an object of the present invention to provide improved solutions for line bushings in a refrigerator, in particular such solutions as facilitate ease of fitting and achieve good leakproofness.

This object is inventively achieved by a line bushing having the features as claimed, a line bushing having the features as claimed, by a refrigerator having the features as claimed, and by a method having the features as claimed.

In accordance with a first aspect of the invention a line bushing for insertion into a wall opening in a wall of a refrigerator, in particular a household refrigerator, comprises an elastic body which has a first cutout for the passage of a first line and at least one second cutout running next to the first cutout for the passage of a second line, wherein the second cutout is designed as a blind hole with a base. In accordance with the invention, a local depression for plugging the second line through the base is formed in the base of the second cutout.

In accordance with a second aspect of the invention a line bushing for insertion into a wall opening in a wall of a refrigerator, in particular a household refrigerator, comprises an elastic body which has a first cutout for the passage of a first line and a second cutout, in particular precisely a second cutout running next to the first cutout, for the passage of a second line, wherein the second cutout is designed as a through-hole, wherein a surface defining the second cutout at least partially forms a sliding surface which locally tapers the cross-section of the cutout, wherein the sliding surface is preferably concavely curved or flat.

In accordance with a third aspect of the invention a refrigerator, in particular a household refrigerator such as an icebox, a chest freezer or an upright freezer or a fridge-freezer combination is provided. The refrigerator comprises an interior compartment defining a refrigeration compartment with multiple walls, wherein at least one wall has a wall opening, a line bushing inserted into the wall opening in accordance with the first or the second aspect of the invention, a first line which extends through the first cutout of the body of the line bushing, and a second line which extends through the second cutout of the body of the line bushing and, if the line bushing is designed in accordance with the first aspect of the invention, penetrates the base of the second cutout in the local depression.

In accordance with a fourth aspect of the invention a method for fitting a refrigerator in accordance with the third aspect of the invention comprises a passage of the first line through the first cutout of the body of the line bushing, a passage of the second line through the second cutout of the body of the line bushing, and an insertion of the body into the wall opening of the interior compartment. If the line bushing is designed in accordance with the first aspect of the invention, the passage of the second line through the second cutout of the body comprises plugging the second line through the local depression which is designed in the base of the second cutout of the body.

The inventive line bushings are implemented with an elastically deformable body which can be inserted into a wall recess and has a first cutout and at least one second cutout designed as a blind hole or as a through-hole.

If a blind hole is provided as a second cutout, a local depression is designed at the base of the blind hole. One idea underlying the invention is to reduce the wall thickness locally at the base of the blind hole, by introducing a depression there. A line can thus be introduced into the depression provided in the blind hole and can there be plugged through the base. One advantage of the invention is that a discrete point for plugging the line through is clearly defined by the position of the depression in the blind hole forming the second cutout. This makes it easier to fit the line bushing. In addition, the base of the blind hole can be implemented with a wall thickness which is relatively large compared to the wall thickness resulting in the depression. This means the base is relatively stable and the line can nevertheless be plugged or pressed though the base with little effort. Thanks to the high mechanical stability of the base, any unintended expansion of the opening resulting from the plugging through can be effectively prevented. Thus the leakproofness of the line bushing, in particular against leakage of insulating foam material, is improved.

If instead of a blind hole with a local depression a through-hole is provided as a second cutout, the through-hole then tapers at least locally, in particular towards one end of the body that faces the refrigeration compartment. As a result, the positioning of the line and the passage of the line through the second cutout are likewise facilitated. Furthermore, the leakproofness and resistance to vibration are improved.

Advantageous embodiments and developments emerge from the subclaims referring back to the independent claims in conjunction with the description.

In accordance with some forms of embodiment it can be provided that a surface of the second cutout surrounding the local depression at least partially forms a sliding surface leading towards the local depression. The sliding surface can define a type of funnel or chute, the deepest point of which is situated on the circumferential edge of the depression. If the second line is introduced into the second cutout, one end of the second line thus slides off the sliding surface and is thereby deflected towards the depression. This facilitates the positioning, required prior to plugging through, of the end of the second line in the depression. The fitting is thus further facilitated.

In accordance with some forms of embodiment it can be provided that the sliding surface is concavely curved or flat. For example, the surface of the base can form a radius or an inclination between the circumferential edge of the local depression and a circumferential wall of the cutout.

In accordance with some forms of embodiment it can be provided that the local depression has a circular cross-section.

In accordance with some forms of embodiment it can be provided that a diameter of the local depression is in a range between 1.3 mm and 2.5 mm.

In accordance with some forms of embodiment it can be provided that the body has a plurality of second cutouts, which are arranged surrounding the first cutout.

Thus multiple second lines can advantageously be led through the wall cutout in a space-saving manner by means of the same line bushing.

In accordance with some forms of embodiment it can be provided that the at least one second cutout is designed in the shape of a ring segment. In particular in the case of multiple second cutouts it is possible to achieve a space-saving arrangement in this way. Furthermore, the elongated but narrow shape further facilitates the positioning of the second line.

In accordance with some forms of embodiment it can be provided that a length of the second cutout, measured along a circular arc that defines the ring-segment shape of the second cutout, is in a range between 2.5 times and 8.5 times a diameter of the local depression. If a second line is plugged through the local depression, the second line is relatively far away from the ends of the second cutout along the circular arc or along the circumferential direction. This makes it easier for insulating foam material to penetrate into the second cutout and enclose the second line therein. This advantageously reduces vibrations in the second line and thus the possible development of noise.

In accordance with some forms of embodiment it can be provided that a wall thickness of the base in the local depression is in a range between 10 percent and 30 percent of a wall thickness of the base outside the local depression. Thus thanks to the local depression the wall thickness is reduced by a considerable amount, e.g. by up to 90 percent. This makes it easier to plug the second line through, even when the base has a mechanically stable, large wall thickness.

In accordance with some forms of embodiment it can be provided that the first cutout is designed as a through-hole. This facilitates the passage of a first line with a large diameter.

In accordance with some forms of embodiment it can be provided that the body is made of a thermoplastic elastomer, from a silicone material or similar.

In accordance with some forms of embodiment it can be provided that the first line is a suction tube and the second line a capillary tube.

In accordance with some forms of embodiment it can be provided that an insulating foam is applied to at least one exterior surface of the wall which is oriented facing away from the refrigeration compartment and which contains the wall opening. The method can accordingly include a step for applying an insulating foam to at least one exterior surface of the wall which is oriented facing away from the refrigeration compartment and which contains the wall opening. The body of the line bushing can in this case be oriented such that the base of the second cutout is situated facing the refrigeration compartment.

The features and advantages disclosed herein in connection with one aspect of the invention are in each case also disclosed for the other aspects.

BRIEF DESCRIPTION OF THE DRAWINGS

The invention is explained below with reference to the figures of the drawings. In the figures.

In the figures, the same reference characters designate the same or functionally equivalent components, unless otherwise stated.

DETAILED DESCRIPTION OF EXEMPLARY EMBODIMENTS

Figure 1:
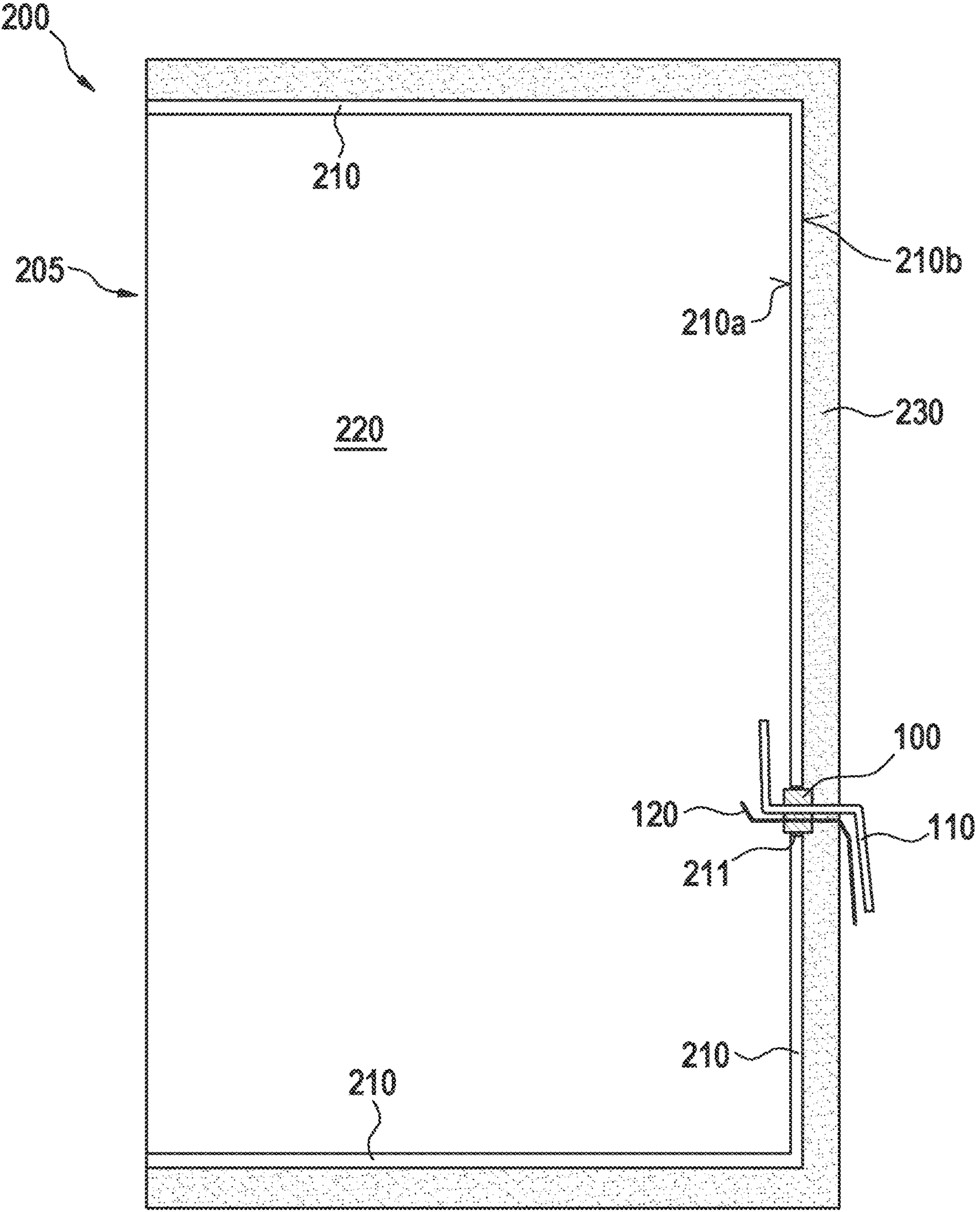
FIG. 1 shows a simplified, schematic sectional view of a refrigerator in accordance with an exemplary embodiment of the invention.

FIG. 1 shows by way of example and schematically a sectional view of a refrigerator 200, in particular a household refrigerator such as an icebox, an upright freezer or a fridge-freezer combination. As schematically shown in FIG. 1, the refrigerator 200 has an interior compartment 205, a line bushing 100, a first line 110, a second line 120 and an optional thermal insulation 230 made of a foam material.

The interior compartment 205 defines an interior space 220 which can be used as a refrigeration compartment or storage compartment for storing refrigerated goods, for example food, drinks, medicines or similar. The interior compartment 205 has multiple walls 210 which delimit the interior space 220. As illustrated purely schematically in FIG. 1, a ceiling wall, a base wall arranged opposite thereto, a back wall extending between the base wall and the ceiling wall, and side walls opposite one another and extending between the base wall and the ceiling wall can for example be provided as walls 210. A wall opening 211 is designed in at least one of the walls 210. FIG. 1 shows, purely by way of example, that the back wall is provided with a wall opening 211.

As further illustrated in FIG. 1, the line bushing 100 is arranged in the wall opening 211 and the first and the second line 110, 120 are introduced in the line bushing 100 from an exterior of the wall 210 through the wall opening 211 into the interior space 220. The wall 210 has an interior surface 210*a* facing the interior space 220 and an exterior surface

210*b* which is oriented facing away from the interior space or the refrigeration compartment and which defines the outside. As shown in FIG. 1, the optional insulation 230 is applied to the exterior surface 210*b* of the wall 210. As will be further explained later, the insulation 230 can in particular be applied in the form of a foam material. The line bushing 100 seals the wall opening 211 against penetration of insulating foam material 230 into the interior space 220 and against escape of moisture from the interior space 220 through the wall opening 211.

The first line 110 can for example be a suction tube, via which an outlet of an evaporator (not shown) arranged in the interior space 220 is or can be connected to a refrigerant compressor (not shown). The first line 110 can generally be a tube, which for example can have an external diameter in a range between 5 mm and 10 mm. The second line 120 can be a capillary tube for example, which connects an inlet of the evaporator to a condenser (not shown). The second line 120 can generally be a tube, which for example can have an external diameter in a range between 1.2 mm and 2.2 mm.

Figure 2:
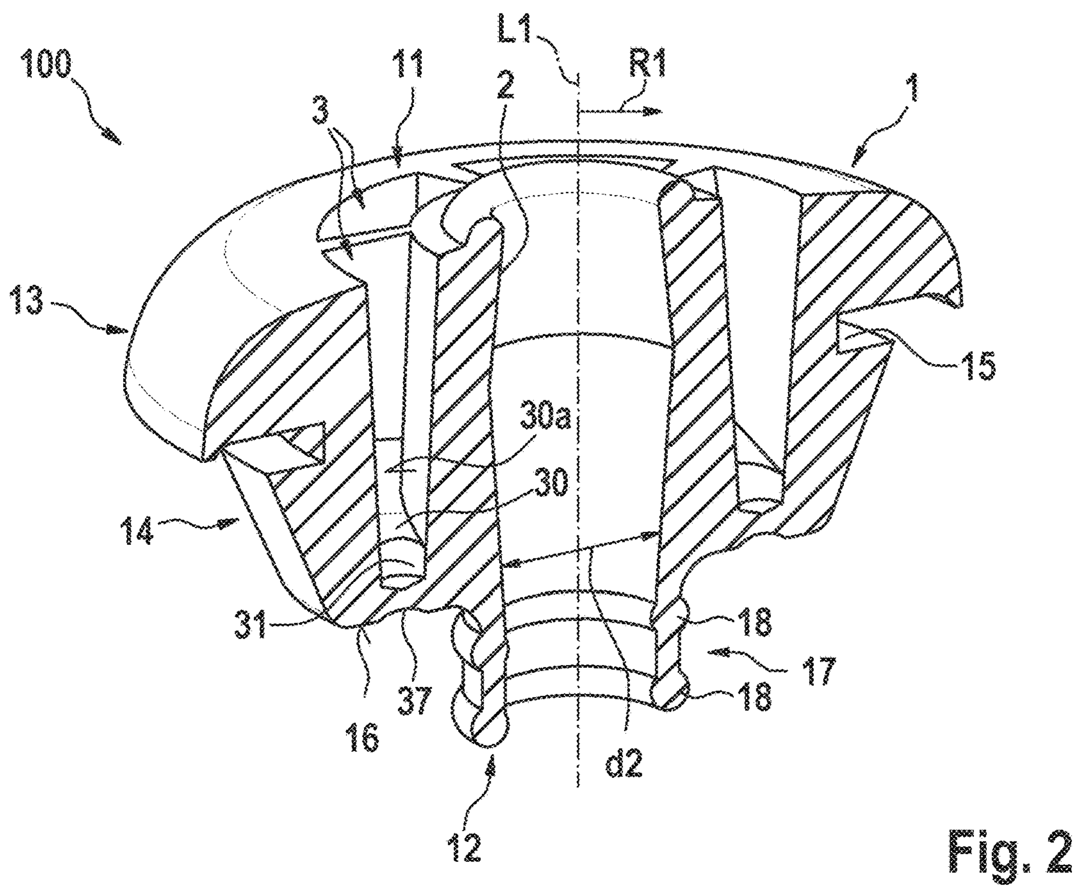
FIG. 2 shows a schematic sectional view of a line bushing in accordance with an exemplary embodiment of the invention.

FIG. 2 shows by way of example a line bushing 100, as can be provided for example in the case of the refrigerator 200 shown in FIG. 1. As shown in FIG. 2, the line bushing 100 has a body 1, in which a first cutout 2 and multiple second cutouts 3 are designed.

The body 1 is made of an elastically deformable material, for example a thermoplastic elastomer, a silicone material or similar. As shown in FIG. 2 by way of example, the body 1 extends between a first end or a first end face 11 and a second end face 12 situated opposite thereto. As further shown in FIG. 2, the body 1 can have an end section 13, forming the first end face 11, which preferably defines a circular external circumference, and a conical section 14 which is optionally separated from the end section 14 by a groove 15. The conical section 14 can form an end surface or shoulder 16 situated opposite the first end face 11. Optionally a connecting piece 17 also projects from the end surface 16 of the conical section 14, as shown in FIG. 2 by way of example. In the case of the line bushing 100 shown in FIG. 2 by way of example one end of the connecting piece 17 forms the second end 12 of the body 1. If the connecting piece 17 is omitted, the end surface 16 forms the second end 12 of the body 1.

The first cutout 2 defines a longitudinal axis L1 and can in particular be formed as a feed-through opening which completely penetrates the body 1 from the first to the second end 11, 12. The first cutout 2 serves for the passage of the first line 110. As shown in FIG. 2 by way of example, the first cutout 2 can for example have a circular cross-section. An internal diameter d2 of the first cutout 2 can for example be in a range between 4 mm and 11 mm. Optionally the internal diameter d2 of the first cutout 2 can change along the longitudinal axis L1. For example, the internal diameter d2 can initially expand, starting from the first end 11 of the body 1 towards the second end 12, and then taper again towards the second end 12, as shown in FIG. 2 purely by way of example.

As shown in FIG. 2 by way of example, beads 18 can optionally be provided on the connecting piece 17, and project into the first cutout 2 and on an external circumferential surface of the connecting piece 17. The beads 18 are provided for abutment to an exterior surface of the second line 110, in order to improve a sealing effect.

The optional groove 15 can in particular be designed circumferentially, i.e. it completely encloses the longitudinal axis L1. The groove 15 serves to accommodate the region of the wall 210 of the interior compartment 205 surrounding the wall opening 211.

Figure 3:
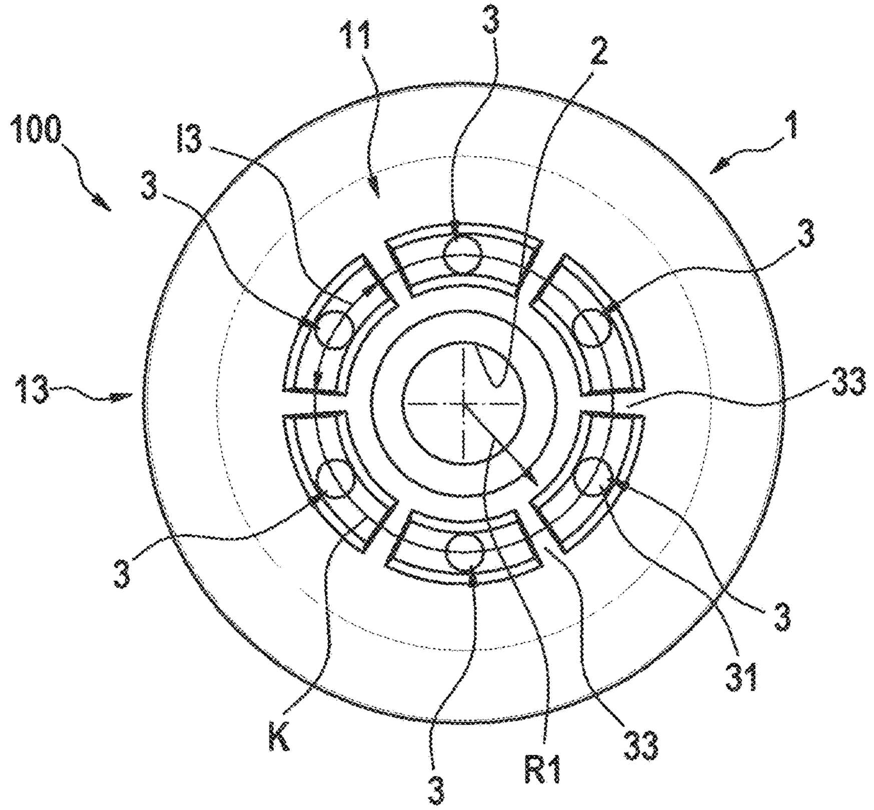
FIG. 3 shows a plan view of a first end face of the line bushing shown in FIG. 2.

As shown in FIG. 3 by way of example, multiple second cutouts 3 can be arranged along a circumferential direction around the first cutout 2. In FIG. 3 six second cutouts 3 are shown purely by way of example. In general at least one second cutout 3 can be provided, which is designed next to the first cutout 2. As shown in FIG. 3, the at least one second cutout 3 is arranged at a distance from the first cutout with respect to a radial direction R1 running transversely to the longitudinal axis L1.

The second cutout 3 is designed as a blind hole, with a base 30, extending out from the first end face 11. With respect to a longitudinal direction defined by the longitudinal axis L1, the second cutout 3 is thus delimited by the base 30 and forms an opening on the first end face 11. The second cutout 3 can for example have a ring-segment-shaped circumference, as is shown in FIG. 3 purely by way of example. If multiple second cutouts 3 are optionally provided, two adjacent cutouts 3 in the circumferential direction can be separated by a web 33.

As shown in FIGS. 2 and 3, a local depression 31 is designed in the base 30 of the second cutout 3. This is provided to accommodate an end of the second line 120, so that this can be plugged through the base 30. As shown in FIG. 3 by way of example, the depression 31 can define a circular cross-section or can have a circular circumference. If the second cutout 3 is designed in the shape of a ring-segment, as shown in FIG. 3 by way of example, it can be provided that a length l3 of the second cutout 3, measured along a circular arc K that defines the ring-segment shape of the second cutout 3, is in a range between 2.5 times and 8.5 times a diameter d31 of the local depression 31. Regardless of the design of the circumference of the second cutout 3 the internal diameter d31 of the local depression can for example be in a range between 1.3 mm and 2.5 mm.

The advantage of the local depression 31 is that the wall thickness t30 of the base 30 is locally reduced. As a result, plugging the second line 120 through the base 30 is simplified. Since the wall thickness t30 is only reduced locally, the base 30 furthermore remains mechanically stable, so that an unintentional expansion of the opening formed by the plugging through is prevented. The wall thickness t30 of the base 30 in a region surrounding the depression 31 and the wall thickness t31 in the depression 31 itself are shown schematically in FIG. 5. For example, it can be provided that the wall thickness t31 of the base 30 in the local depression 31 is in a range between 10 percent and 30 percent of the wall thickness t30 of the base 30 outside the local depression 30.

Figure 4:
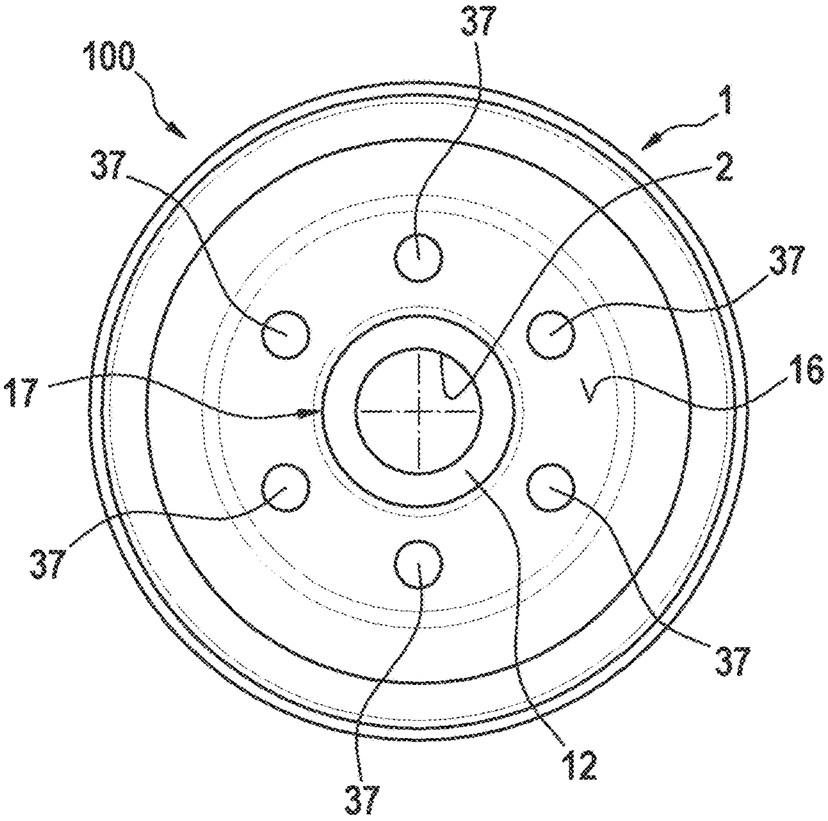
FIG. 4 shows a plan view of a second end face of the line bushing shown in FIG. 2.

Optionally the end surface 16 can be provided with additional local depressions 37, which are arranged in accordance with the local depressions 31 in the second cutouts 3, in order further to reduce the wall thickness t31 in the depression, as is shown in FIGS. 2 and 4 by way of example. The number of local depressions 37 on the end surface 16 preferably corresponds to the number of second cutouts 3.

Figure 5:
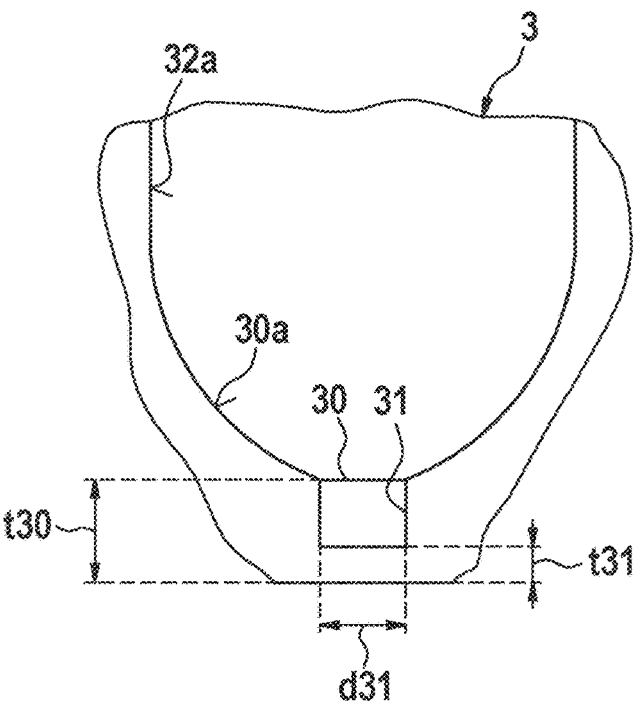
FIG. 5 shows an enlarged sectional view of a line bushing in accordance with an exemplary embodiment of the invention in the region of the base of a second cutout of the line bushing.

As shown in FIGS. 2 and 5 by way of example, the second cutout 3 can be provided with a sliding surface leading towards the local depression. As shown schematically in FIG. 5, the sliding surface can be formed by a surface 30*a* surrounding the second cutout 3, e.g. by the surface of the base 30. The surface 30*a* connects a circumferential edge or at least part of the circumferential edge of the local depression 31 to an interior surface 32*a* which defines the interior circumference of the second cutout 3 and extends in parallel to the longitudinal axis L1. However, the surface 30*a* can in this case run flat but inclined or, as shown in FIG. 5 by way of example, concavely curved, e.g. as a radius. Thus, as shown in FIG. 5, a type of funnel is formed, the deepest point of which is formed by the local depression 31. This makes it easier to introduce the end of the second line 120 into the local depression 31.

Figure 6:
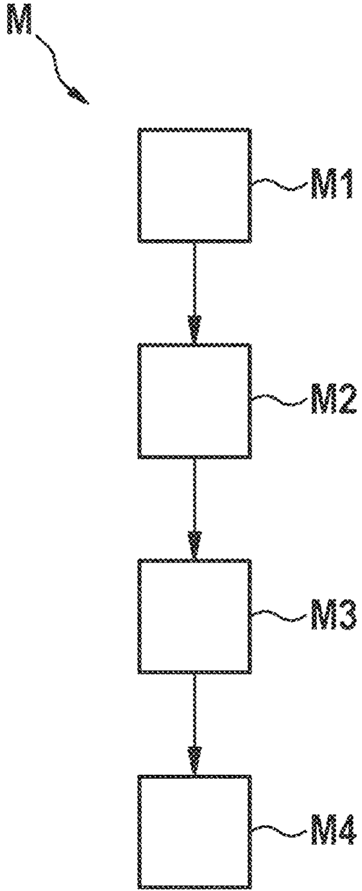
FIG. 6 shows a flow diagram of a method for fitting a refrigerator in accordance with an exemplary embodiment of the invention.

FIG. 6 shows the operational sequence of a method M for fitting a refrigerator 200, which is explained below by way of example with reference to the refrigerator 200 shown in FIG. 1 and the line bushing 100 shown in FIGS. 2 to 5.

In a first step M1 the first line 110 is passed through the first cutout 2 in the body 1 of the line bushing 100. The first line 110 then extends through the first cutout 2 through the body 1, wherein an internal circumference of the first cutout 2, in particular the optional beads 18, abuts the first line 110.

In a further step M2 the second line 120 is introduced into the second cutout 3 and is passed through the second cutout 3. When the line bushing 100 described above is used the second line 120 is positioned in the local depression 31 and is pressed or plugged through the base 30 of the second cutout 3. The second line 120 then extends through the body 1 and in this case runs through the second cutout 3.

In a further step M3 the body 1 is inserted into the wall opening 211 of the interior compartment 205, in particular such that the second end 12 of the body 1 is situated facing the interior space 220 and the first end 11 of the body 1 points towards the exterior of the wall 210. For example, a region of the wall 210 surrounding the wall opening 211 can protrude into the optional groove 15 of the body 1 and the first end section 13 can abut the exterior surface 211*b* of the wall 210. It is understood that step M3 can be carried out before steps M1 and M2. This means the first and the second line 110, 120 can be passed or plugged through cutouts 2, 3 in the body 1 already seated in the wall opening 211. Alternatively it is conceivable for the lines 110, 120 to be guided through the cutouts 2, 3 first and then for the body 1 and lines 110, 120 to be inserted together into the wall opening 211.

As further shown in FIG. 6, in the optional step M4 an insulating foam 230 can be applied to the exterior surface 211*b* of the wall 210 which contains the wall opening 211. All walls 211 of the interior compartment 205 can preferably be surrounded with insulating foam 230. The foam material 230 in this case abuts the first end face 11 of the body 1 and penetrates into the second cutouts 3. As a result, the body 1 is pressed onto the exterior surface 211*b* of the wall 211. Further, a force acting in the radial direction R1 is applied, which in the region of the cutout 2 abuts the body 1 closely to the first line 110. Thanks to the relatively large wall thickness t30 of the base 30 of the second cutout 3 there are hardly any deformations at the plug point of the second line 120 through the base 30. Thus any penetration of foam into the interior space 220 is effectively prevented.

Although the present invention has been explained above using exemplary embodiments, it is not restricted to these but can be modified in a variety of ways. In particular, combinations of the above exemplary embodiments are also conceivable.

For example, it can be provided that the first end face 11 of the body 1 is not, as shown in FIG. 2 by way of example, formed by a substantially flat or slightly convexly curved surface, but has a conical depression. A wall thickness of the end section 13 in respect of the radial direction R1 is thereby reduced. Accordingly the end, facing the first end face 11, of the first cutout 2 can be arranged along the longitudinal axis L1 at a distance from the first end 11 of the body 1, in particular at the bottom of the conical depression.

Alternatively to a second cutout 3 designed as a blind hole, the line bushing can also have only one second cutout designed as a through-hole. In this case nevertheless a sliding surface 30*a* is provided, as was explained above, so that the through-hole tapers towards the shoulder 16 or towards the second end 12 of the body 1.

REFERENCE CHARACTERS

1 Body
2 First cutout
3 Second cutout
11 First end/first end face
12 Second end/second end face
13 End section
14 Conical section
15 Groove
16 End surface
17 Connecting piece
18 Bead
30 Base
30*a* Surface/sliding surface
31 Local depression
32*a* Interior surface of the second cutout
33 Web
37 Depression
100 Line bushing
110 First line
120 Second line
200 Refrigerator
205 Interior compartment
210 Wall
210*a* Interior surface of the wall
210*b* Exterior surface of the wall
211 Wall opening
220 Interior space/refrigeration compartment
230 Insulating foam
d2 Diameter of the first cutout
d31 Diameter of the local depression
K Circle
L1 Longitudinal axis
l3 Length
t30 Wall thickness of the base
t31 Wall thickness in the local depression

The invention claimed is:

1. A line bushing for insertion into a wall opening in a wall of a refrigerator, the line bushing comprising:
- an elastic body formed with a first cutout for a passage of a first line through said elastic body and with at least one second cutout running next to said first cutout for a passage of a second line;
- said second cutout being formed as a blind hole with a base; and
- said base of said second cutout being formed with a local depression having a closed bottom surface for plugging the second line through said base.

2. The line bushing according to claim 1, wherein a surface of said second cutout surrounding said local depression at least partially forms a sliding surface leading towards said local depression.

3. The line bushing according to claim 2, wherein said sliding surface is a concavely curved or flat surface.

4. The line bushing according to claim 1, wherein said local depression has a circular cross-section.

5. The line bushing according to claim 1, wherein a diameter of said local depression lies in a range between 1.3 mm and 2.5 mm.

6. The line bushing according to claim 1, wherein said at least one second cutout has a shape of a ring segment.

7. The line bushing according to claim 6, wherein a length of said second cutout, measured along a circular arc that defines said ring-segment shape of said second cutout, lies in a range between 2.5 times and 8.5 times a diameter of said local depression.

8. The line bushing according to claim 1, wherein a wall thickness of said base in said local depression lies in a range between 10 percent and 30 percent of a wall thickness of said base outside said local depression.

9. The line bushing according to claim 1, wherein said first cutout is a through-hole.

10. The line bushing according to claim 1, wherein said elastic body is made of a thermoplastic elastomer or of a silicone material.

11. A refrigerator, comprising:

an interior compartment, defining a refrigeration compartment, with a plurality of walls, wherein at least one of said walls is formed with a wall opening;

a line bushing according to claim 1 inserted into said wall opening;

a first line extending through the first cutout in the elastic body of the line bushing; and a second line extending through the second cutout of the elastic body of the line bushing and penetrating through the base of the second cutout.

12. The refrigerator according to claim 11, wherein said first line is a suction tube and said second line is a capillary tube.

13. The refrigerator according to claim 11, which comprises insulating foam applied to at least one exterior surface of the at least one wall which is oriented facing away from the refrigeration compartment and which is formed with the wall opening.

14. The refrigerator according to claim 11, being a household refrigerator.

15. A method for fitting a refrigerator, the method comprising:

providing a refrigerator according to claim 11;

passing a first line through the first cutout of the elastic body of the line bushing;

passing a second line through the second cutout of the elastic body; and inserting the elastic body into the wall opening in the interior compartment of the refrigerator.

16. The method according to claim 15, further comprising applying of an insulating foam to at least one exterior surface of the wall which is oriented facing away from the refrigeration compartment and which is formed with the wall opening.

* * * * *